Dec. 22, 1942.　　　A. M. CRAVATH　　　2,305,952

WATTMETER

Original Filed Dec. 26, 1940

INVENTOR.
Austin M. Cravath.
BY
HIS ATTORNEY.

Patented Dec. 22, 1942

2,305,952

UNITED STATES PATENT OFFICE 2,305,952

WATTMETER

Austin M. Cravath, San Francisco, Calif., assignor to The Union Switch and Signal Company, Swissvale, Pa., a corporation of Pennsylvania Original application December 26, 1940, Serial No. 371,673. Divided and this application February 17, 1942, Serial No. 431,277

11 Claims. (Cl. 171—95)

My invention relates to wattmeters and more particularly to indicating wattmeters which are capable of accurately measuring small amounts of power in high frequency circuits.

One object of my invention is to provide an instrument of the above character having the ruggedness and simplicity of the usual sensitive direct current voltmeter or ammeter of the D'Arsonval type. Another object of my invention is to provide an instrument of this character which will accurately measure small amounts of power and whose accuracy will be very high both when the frequency of the supply circuit is low and when it is high. A further object of my invention is to provide an accurate indication of the average power by means of the usual D'Arsonval galvanometer type of instrument such as a voltmeter or ammeter calibrated to indicate watts. A still further object of my invention is to provide an instrument which is relatively small, light-weight, and inexpensive to manufacture. Other objects, advantages and characteristic features of my invention will be apparent from the description which follows.

I accomplish the foregoing objects by providing a normally balanced electrical bridge arrangement comprising a pair of asymmetric units and having a D'Arsonval type direct current instrument connected therewith in such a manner that the current due to the potential input applied to the bridge will flow in the low resistance direction in both asymmetric units but the current due to the load current input will flow in the aiding direction in one asymmetric unit and in the opposing direction in the other asymmetric unit, thus unbalancing the bridge and causing the meter to provide an indication. In another form of the invention, the current due to the load current input flows in the same direction in both asymmetric units and the unbalance is provided by the potential input.

The present application is a division of my co-pending application Serial No. 371,673, filed on December 26, 1940, for Wattmeters.

I shall describe two forms of apparatus embodying my invention and shall then point out the novel features thereof in claims.

Figure 1:
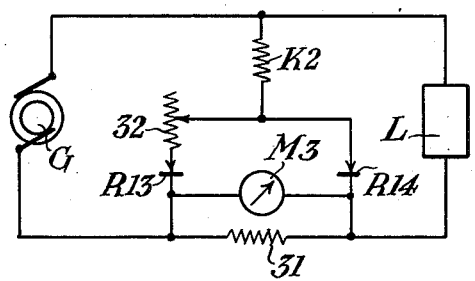
Figure 2:
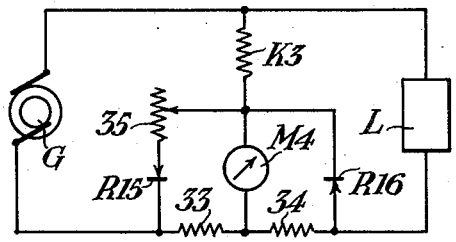

In the accompanying drawing, Fig. 1 is a diagrammatic view showing one form of apparatus embodying my invention. Fig. 2 is a diagrammatic view showing a modified form of the apparatus of Fig. 1, also embodying my invention.

Similar reference characters refer to similar parts in each of the two views.

The usual indicating wattmeter is of the well-known dynamometer type and indicates average power with a satisfactory degree of accuracy provided that the frequency is not too high and the amount of power being measured is not too small. However, there is not now available, as far as I am aware, a high frequency wattmeter sufficiently sensitive to measure a very small amount of power, nor any instrument for indicating average power having the ruggedness and simple construction of the usual direct current type of meter. The apparatus embodying my invention is directed not only to providing a sensitive high frequency wattmeter but also to overcoming some of the shortcomings of the usual dynamometer type power indicating instrument.

Preferably, I employ copper oxide rectifiers as the asymmetric units because the characteristics of these rectifiers are particularly well adapted for the purposes of my invention. It will be clearly understood, however, that any suitable asymmetric resistor which exhibits an appreciable change of resistance with current (preferably a linear change over the operating range of the instrument for maximum accuracy) may be used, as well. A suitable indicating instrument which may be of the D'Arsonval galvanometer type is used to provide the watt indication.

In analyzing the fundamental operation of the circuits shown in this disclosure, it appears that the essential requirements for a wattmeter of the type herein disclosed are: first, at least two rectifiers so connected that they produce equal opposing currents through the meter when either current or potential input alone is effective; and second, the paths through the rectifiers for both the current input and the potential input must be in the same direction for the rectifiers which produce direct current in one direction through the meter, and in opposite directions for the rectifiers which produce direct current in the opposite direction through the meter.

The simplest way in which the above conditions can be satisfied is to use pairs of rectifiers connected to the meter in symmetrical opposition. The circuit can be so arranged that the components of the rectifier alternating current which are due to the load current input oppose one another, whereas the components due to the potential input aid one another as in Fig. 1; or, the circuit can be arranged in the reverse manner wherein the current input components will aid and the potential input components will oppose one another as in Fig. 2. In either case, the meter reading will be proportional to the product of the load current and load potential, as required.

Referring now to Fig. 1, the wattmeter of this figure employs only two rectifiers R13 and R14 and makes use of a comparatively simple circuit in which, however, alternating current is present in the meter M3 under certain conditions. Since it is only necessary for the direct current to vanish, under certain conditions, the presence of the alternating current is unobjectionable for my purposes. In Fig. 1, the generator G supplies current to the load L through the resistor 31 which supplies the current input to the meter M3. The potential input to the meter is supplied over the multiplying resistor K2 and the rectifiers R13 and R14 in parallel. The resistor 32 may be used to compensate for the slight lack of symmetry in the two current paths through the rectifiers due to the potential input, this dissymmetry being caused by the presence of resistor 31 in one of the paths or by slight inequalities in the rectifiers themselves. Resistor 31 should preferably have a low ohmic value as compared with that of the multiplying resistor K2.

Since the meter M3 is connected directly across the terminals of the resistor 31, alternating current will flow through the meter whenever load current is being supplied because of the alternating potential drop developed across resistor 31. This alternating current will not, however, affect the indication of meter M3 in any appreciable manner because this meter is designed to respond only to direct current. The meter alternating current will vanish when the load current is zero. No alternating current will flow in the meter due to the potential input because the voltage drops in the rectifiers R13 and R14 will be substantially equal so that no appreciable alternating potential difference will exist across the meter terminals. As a matter of fact, with the load current zero, a slight alternating as well as unidirectional voltage drop will exist across resistor 31, but this will be due only to a portion of the potential input current and can be made quite small in relation to the unbalanced drop which causes a meter reading, so that its effect can be neglected.

In operation, during the half-cycle when the upper terminal of the generator G is positive, the current which flows due to the potential input will flow downwardly or in the low resistance direction through both rectifiers R13 and R14 so that no appreciable direct current will flow in the meter due to the potential input alone. If the load current alone is present, then during the half-cycle when the right-hand terminal of resistor 31 is positive, the voltage drop due to the load current will cause current to flow upwardly or in the reverse direction through rectifier R14, and downwardly in the aiding direction through rectifier R13. Thus, the flow of load current destroys the symmetry of the two rectifier paths by increasing the resistance of rectifier R14 and decreasing the resistance of rectifier R13 so that if now a potential input is added, the voltage drops across the rectifiers due to the potential input will be unequal and a net unidirectional current will flow through the meter M3, this current being proportional both to the load potential and to the degree of rectifier unbalance, or load current. No reading will be given by the meter when the load current input acts alone since the current which tends to flow in one direction through the meter during one half-cycle will be offset by the current which tends to flow in the opposite direction through the meter during the other half-cycle. During the half-cycle when the lower terminal of the generator is positive, the left-hand terminal of resistor 31 will be positive so that the resistance of rectifier R13 will be increased and that of rectifier R14 will be decreased. However, during this same half-cycle, the polarity of the current due to the potential input will also reverse, so that if the potential input is effective, the current through the meter M3 will again be in the same direction as before. Accordingly, the meter will indicate power as long as both the potential input and current input are effective but will provide no indication when either input alone is present.

A modification of the apparatus, in which the alternating current is balanced out of the meter when load current alone is effective, is shown in Fig. 2. In this figure, some alternating current will be present in the meter whenever a potential input is effective, and this alternating current will vanish only when the load potential is zero. The current input resistor is divided into two substantially equal portions 33 and 34 which form two arms of the bridge, the rectifiers R15 and R16 comprising the other two arms. The potential input is conducted into the bridge by means of the multiplying resistor K3, as in Fig. 1, and the meter M4 is connected across the junction points of the two resistors and the two rectifiers. The compensating resistor 35 can be used to adjust for any initial dissymmetry in the apparatus.

Assuming that there is no potential input to the meter M4 but that current is being supplied to the load, the voltage drop in each of resistors 33 and 34 will be the same so that at any instant the currents in the meter will balance out since as much current will flow through the meter in one direction due to the drop across 33 as will flow through the meter in the opposite direction due to the drop across 34. The two rectifiers will remain balanced because whatever change in resistance may occur due to the current input will be the same in both. Accordingly, no direct current will flow in meter M4 when current input alone is effective. A potential input acting alone will likewise produce no reading on the meter because the currents which tend to flow in the meter under this condition will be of opposite polarity for the two half-cycles so that the effect will be cancelled out.

Assuming that the upper terminal of generator G is positive, then during this half-cycle the current due to the potential input will flow in the aiding direction in rectifier R15 and in the opposing direction in rectifier R16 so that symmetry of the bridge will be destroyed. If a load current input is simultaneously effective, then the currents due to the voltage drops across resistors 33 and 34 will encounter different resistances and a net unidirectional current proportional to both the potential and the current input will flow through the meter M4, thus providing a power indication. During the other half-cycle, the bridge will be unbalanced in the reverse direction, but since the voltage drops across resistors 33 and 34 will also be reversed, the current in the meter will continue in the same direction as before.

Since in each of Figs. 1 and 2 the alternating current is not completely balanced out of the meter under certain conditions, some unidirectional current will flow through the meter with only one of the two inputs effective, should a direct current source be substituted for the alternating current generator G. Accordingly, the apparatus of Figs. 1 and 2 should be used only in alternating current circuits.

Although I have described my invention as being particularly useful for measuring power in circuits carrying currents at high frequencies and for measuring small amounts of power such as are difficult to measure accurately by present-day commercial wattmeters, it will be understood that my invention is not limited to high frequency service or to low-power measurement. Apparatus embodying my invention will measure large amounts of power at low frequencies equally well, and will measure alternating current power by means of a simple D'Arsonval type of instrument. It will also be understood that although I prefer to use asymmetric or resistance units of the copper oxide type because of the desirable resistance characteristics of these units, my invention is not limited to the use of copper oxide rectifiers as, obviously, any suitable asymmetric unit which exhibits the desired change of resistance with the current flowing therethrough may be used as well, and my invention contemplates such use.

Although I have herein shown and described only two forms of wattmeters embodying my invention, it is understood that various changes and modifications may be made therein within the scope of the appended claims without departing from the spirit and scope of my invention.

Having thus described my invention, what I claim is:

1. A wattmeter comprising, in combination, a network including a load current carrying resistor and two asymmetric units all connected in series, said asymmetric units having substantially equal electrical characteristics and exhibiting a change of resistance with current which is substantially linear over their operating range, means for establishing a potential proportional to one factor of the load power across said two asymmetric units in parallel, said load resistor establishing a potential proportional to the other factor of the load power, said asymmetric units being poled in such manner that the potential due to one of said factors but not the other unbalances said network and causes unequal currents to flow in said asymmetric units, and means for measuring the potential difference resulting from the flow of said unequal currents.

2. A wattmeter comprising, in combination, a network including a load current carrying resistor and two asymmetric units all connected in series, said asymmetric units having substantially equal electrical characteristics and exhibiting a change of resistance with current which is substantially linear over their operating range, means for establishing a potential proportional to one factor of the load power across said two asymmetric units in parallel, said load resistor establishing a potential proportional to the other factor of the load power, said asymmetric units being poled in such manner that the potential due to one of said factors but not the other unbalances said network and causes unequal currents to flow in said asymmetric units, and a voltmeter-type direct current instrument connected into said network in such manner as to measure the potential difference resulting from the flow of said unequal currents.

3. A wattmeter comprising, in combination, a network including a load current carrying resistor and two asymmetric units all connected in series, said asymmetric units having substantially equal electrical characteristics and exhibiting a change of resistance which is substantially linear over their operating range, means for establishing a potential proportional to the load voltage across said two asymmetric units in parallel, said load resistor establishing a potential proportional to the load current, said asymmetric units being poled in such manner that one of said two potentials but not the other causes unequal currents to flow in said two asymmetric units, and means for measuring the potential difference resulting from the flow of said unequal currents.

4. A wattmeter comprising, in combination, a network including a load current carrying resistor and two copper oxide rectifier units all connected in series, means for establishing a potential proportional to the load voltage across said two copper oxide rectifier units in parallel, said load resistor establishing a potential proportional to the load current, said rectifier units being poled in such manner that one of said two potentials but not the other causes unequal currents to flow in said two rectifier units, and means for measuring the potential difference resulting from the flow of said unequal currents.

5. Apparatus for measuring power comprising, in combination with a source of alternating current and a load receiving current from said source, a resistor connected in series with one terminal of said load for establishing a potential drop proportional to the load current, a voltmeter-type direct current instrument connected across said resistor, a pair of asymmetric units also connected across said resistor, said units being poled in opposite directions and having substantially equal electrical characteristics, said units also exhibiting a change of resistance with current which is substantially linear over their operating range, and a potential input resistor connected from the other terminal of said load to the junction point of said two asymmetric units.

6. Apparatus for measuring power comprising, in combination with a source of alternating current and a load receiving current from said source, a resistor connected in series with one terminal of said load for establishing a potential drop proportional to the load current, a voltmeter-type direct current instrument connected across said resistor, a pair of asymmetric units also connected across said resistor, said units being poled in opposite directions and having substantially equal electrical characteristics, said units also exhibiting a change of resistance with current which is substantially linear over their operating range, a potential input resistor connected from the other terminal of said load to the junction point of said two asymmetric units, and a compensating resistor connected in series with one of said asymmetric units to compensate for the dissymmetry in the potential input paths between said junction point and the source terminal of said load current resistor.

7. A wattmeter comprising, in combination, a network including a load current carrying resistor and two oppositely poled asymmetric units all connected in series, said asymmetric units having substantially equal electrical characteristics and exhibiting a change of resistance with current which is substantially linear over their operating range, a voltmeter-type direct current instrument connected across said load current resistor, and means for applying load potential across said two asymmetric units in parallel.

8. A wattmeter comprising, in combination, a network including a load current carrying resistor and two oppositely poled copper oxide rectifier units all connected in series, said rectifier units having substantially equal electrical characteristics, a voltmeter-type direct current instrument connected across said load current resistor, and means for applying load potential across said two copper oxide rectifier units in parallel.

9. A wattmeter comprising, in combination, a network including a load current carrying resistor and two oppositely poled copper oxide rectifier units all connected in series, said rectifier units having substantially equal electrical characteristics, a voltmeter-type direct current instrument connected across said load current resistor, a resistor connected to the junction point between said rectifier units for applying load potential to said network, and a compensating resistor connected in series with one of said rectifier units to compensate for the dissymmetry in the two potential input paths of said network from said junction point to the source terminal of said load current resistor.

10. A wattmeter comprising, in combination, a network including a load current carrying resistor and two similarly poled asymmetric units all connected in series, said asymmetric units having substantially equal electrical characteristics and exhibiting a change of resistance with current which is substantially linear over their operating range, means for applying a potential proportional to the load potential across said two asymmetric units in parallel, and a voltmeter-type direct current instrument connected from the mid-point of said resistor to the junction point of said two asymmetric units.

11. A wattmeter comprising, in combination, a network including a load current carrying resistor and two similarly poled copper oxide rectifier units all connected in series, said copper oxide rectifier units having substantially equal electrical characteristics and exhibiting a change of resistance with current which is substantially linear over their operating range, means for applying a potential proportional to the load potential across said two copper oxide rectifier units in parallel, and a voltmeter-type direct current instrument connected from the mid-point of said resistor to the junction point of said two copper oxide rectifier units.

AUSTIN M. CRAVATH.